US 8,422,400 B2

(12) United States Patent
Claise et al.

(10) Patent No.: US 8,422,400 B2
(45) Date of Patent: Apr. 16, 2013

(54) METHOD AND APPARATUS FOR DISCOVERING DEVICES IN A NETWORK

(75) Inventors: Benoit Claise, Othee (BE); Erik De Kegel, III, Wetteren (BE)

(73) Assignee: Cisco Technology, Inc., San Jose, CA (US)

(*) Notice: Subject to any disclaimer, the term of this patent is extended or adjusted under 35 U.S.C. 154(b) by 503 days.

(21) Appl. No.: 12/609,451

(22) Filed: Oct. 30, 2009

(65) Prior Publication Data

US 2011/0103257 A1   May 5, 2011

(51) Int. Cl.
*H04L 12/28* (2006.01)
*G06F 15/173* (2006.01)

(52) U.S. Cl.
USPC ............................ 370/254; 709/224

(58) Field of Classification Search .................. None
See application file for complete search history.

(56) References Cited

U.S. PATENT DOCUMENTS

| | | | | |
|---|---|---|---|---|
| 7,778,201 B2* | 8/2010 | Daines et al. | ................ | 370/254 |
| 7,869,382 B2* | 1/2011 | Hamedi et al. | ................ | 370/254 |
| 7,876,772 B2* | 1/2011 | Kwan | ..................... | 370/449 |
| 2003/0229686 A1* | 12/2003 | Kortright | ..................... | 709/220 |
| 2004/0120250 A1* | 6/2004 | Langevin et al. | ............. | 370/216 |
| 2008/0310421 A1* | 12/2008 | Teisberg et al. | ........... | 370/395.53 |

OTHER PUBLICATIONS

Author Unknown, Implementation Guide: Deploying EX-series Switches in Branch Office, Juniper Networks Publication, Sep. 2008, pp. 1 and 25-26.*
M. Wadekar, BCB Capability Exchange Protocol Base Specification, Rev. 1.0, pp. 1-29, Jul. 16, 2008.*
Author Unknown, EMC Fibre Channel over Ethernet Installation and Configuration Guide, pp. 1-2 and 113-115.*

* cited by examiner

*Primary Examiner* — Faruk Hamza
*Assistant Examiner* — Christopher Crutchfield
(74) *Attorney, Agent, or Firm* — P. Su

(57) ABSTRACT

In one embodiment, a method includes identifying whether there is a first device in a network that is expected to be associated with a discovery protocol but does not have the discovery protocol turned on. The method also includes providing a notification to a management arrangement when the first device is identified. The management arrangement manages the network, and the notification indicates that the first device is expected to be associated with the discovery protocol but does not have the discovery protocol turned on.

21 Claims, 5 Drawing Sheets

US 8,422,400 B2

METHOD AND APPARATUS FOR DISCOVERING DEVICES IN A NETWORK

BACKGROUND

The present invention relates generally to networking.

Network discovery generally allows a device, e.g., a network element such as a computer that is part of a network, to effectively detect other devices on the network. In other words, network discovery allows a device within a network to essentially discover the topology of the network. Network discovery is often a challenging task, particularly in relatively large networks in which there are many devices.

Network discovery may be implemented using a variety of different methods. Such methods, however, have drawbacks. For example, although a "ping sweep" method is generally capable of discovering substantially all devices in a network by testing substantially every Internet protocol (IP) address within a range, such testing generally consumes a significant number of resources and, thus, places a significant load on the network. Hence, a ping sweep method is not frequently implemented, resulting in some new devices within a network not being discovered substantially in real-time.

A layer 2 discovery protocol allows a device to advertise its identity and capabilities on a network and to detect and store the identity and capabilities of neighboring devices on the local network. The Link Layer Discovery Protocol (LLDP) is a vendor-neutral Layer 2 protocol that allows the previously described functions. The protocol was formally ratified as IEEE standard 802.1AB-2005 in May 2005. In general, LLDP allows each device to advertise information about itself to neighboring devices in the network, and stores information it discovers from the neighboring devices. LLDP-based discovery is generally effective in allowing devices within a network to be discovered, provided that the devices have LLDP turned "on" or otherwise deployed. However, not all devices in a network have LLDP turned on. For example, older devices may not support LLDP. As such, LLDP-based discovery may be unable to discover substantially all devices within a network.

BRIEF DESCRIPTION OF THE DRAWINGS

The embodiments will be readily understood by the following detailed description in conjunction with the accompanying drawings in which.

DESCRIPTION OF EXAMPLE EMBODIMENTS

General Overview

Figure 1:
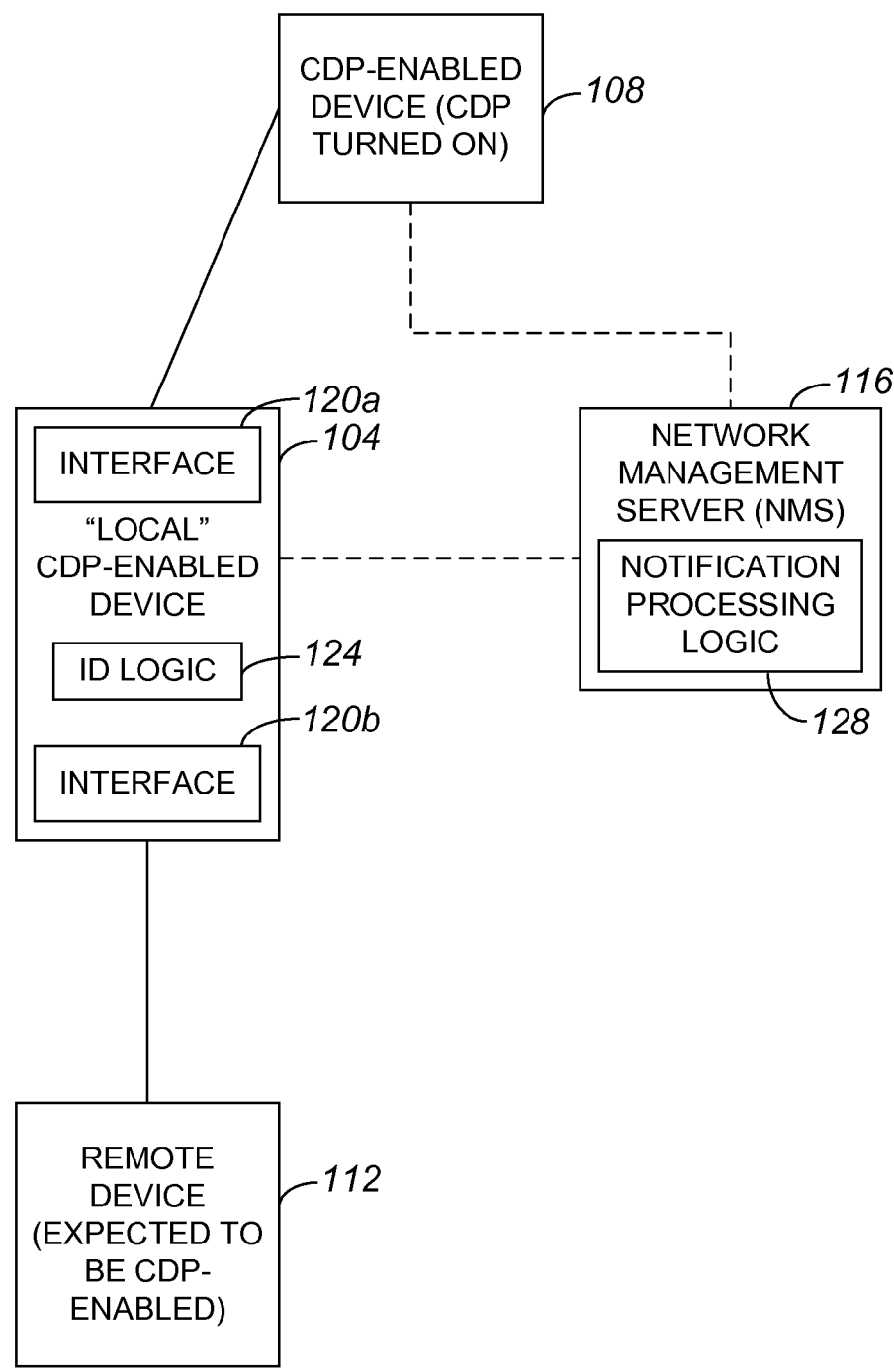
FIG. 1 is a diagrammatic representation of a network that includes Cisco Discovery Protocol (CDP) based devices in accordance with an embodiment.

According to one aspect of the present disclosure, a method includes identifying whether there is a first device in a network that is expected to be associated with a discovery protocol but does not have the discovery protocol turned on. The method also includes providing a notification to a management arrangement when the first device is identified. The management arrangement manages the network, and the notification indicates that the first device is expected to be associated with the discovery protocol but does not have the discovery protocol turned on.

DESCRIPTION

One layer 2 discovery protocol is Cisco Discovery Protocol (CDP). CDP is used to allow a network device to advertise its identity and capabilities on a network. CDP is generally used by a network device to obtain the identity and capabilities of neighboring devices in a network. Network devices typically use CDP to periodically advertise information to a multicast address on a network, substantially making the information available to any device or application on a local area network (LAN). CDP may also be used by a network device to provide information about its interface, e.g., about the capabilities of a point-to-point or multipoint interface.

When a device in a network is either unable to support LLDP or CDP, or otherwise does not have LLDP or CDP capability turned "on," LLDP-based or CDP-based discovery may be arranged to provide identify that device as being within the network. In other words, an indication may be provided to a network management system (NMS), as for example by a network device, that there is a neighboring device in a network which should have LLDP or CDP turned on but does not. Using such an indication, the NMS, which is arranged to represent a map of a network topology, may attempt to effectively turn on LLDP or CDP on the neighboring device. It should be appreciated that having LLDP or CDP capability turned on includes, but is not limited to including, activating LLDP or CDP, and/or otherwise permitting LLDP-based or CDP-based discovery to discover the neighboring device.

In one embodiment, an indication that may be provided by a network device to a NMS when a neighboring device which is expected to have LLDP or CDP turned on but does not may be a simple network management protocol (SNMP) notification. Such an SNMP notification may include, but is not limited to including, an address for the device that is sending the SNMP notification, information which identifies an interface supported by the neighboring device, and an address for the neighboring device which is expected to have LLDP or CDP turned on but does not. The SNMP notification may effectively indicate to the NMS that a device at a remote end of a link is expected to have LLDP or CDP turned on but does not have LLDP or CDP turned on.

A network device, e.g., a local network router, that is CDP-enabled or CDP-capable and has CDP effectively turned on may poll its neighboring devices to identify those neighboring devices. It should be appreciated that although a CDP-enabled device is described, a network device may instead be an LLDP-enabled device or a device that is enabled to support any suitable layer 2 discovery protocol. That is, the present disclosure is not limited to being suitable for implementation with respect to CDP and LLDP, and may generally be applicable with respect to any suitable layer 2 discovery protocol.

In polling neighboring devices, a local network router may determine if a neighboring device is CDP-enabled or if the neighboring device is expected to be CDP-enabled but does not have CDP turned on.

The local network router may provide a NMS or other network management device with information which indicates that a new device has been discovered within the network. Such a notification may indicate whether a particular neighboring device that was effectively discovered does not have CDP turned on. In general, a new CDP-enabled device may be on any interface, as for example a point-to-multipoint interface. As will be appreciated by those skilled in the art, a device that is on a point-to-multipoint interface is typically only known to the local network router if the device is CDP-enabled.

Referring initially to FIG. 1, a network that includes CDP-enabled devices will be described in accordance with an embodiment. A network 100 generally includes a plurality of devices such as devices 104, 108, 112. Devices 104, 108, 112 may generally be any devices or nodes which are capable of being networked. In one embodiment, device 104 may be a router.

Devices 104, 108 are CDP-enabled and have CDP turned on, while device 112 is expected, as for example by device 104, to be CDP-enabled, but does not have CDP turned on. Device 104 may generally send identifying messages to a multicast address on each active CDP-enabled interface, and monitors messages sent by other devices, e.g., device 108 which is CDP-enabled and has CDP turned on. It should be appreciated that while device 104 may generally communicate with devices that are not CDP-enabled but are within a propagation network associated with device 104. As will be understood by those skilled in the art, a propagation network essentially defines boundaries, e.g., boundaries within an overall network, relating to the discovery of devices. In other words, a propagation network substantially establishes boundaries within which devices are to be discovered.

Device 104 communicates with an NMS or a network management application 116 to provide NMS 116 with information regarding devices known to device 104. In the embodiment as shown, as device 108 is known to device 104 and has CDP turned on, device 104 provides information to NMS 116 regarding device 108. Such information may be provided using substantially any method including, but not limited to, using a polling mechanism associated with NMS 116. Such information may also be provided to device 104 through a notification. Upon obtaining the information, device 104 may populate a map.

Device 104 has at least one interface 120a, 120b that allows device 104 to interface with other devices. As shown, interface 120a is up such that device 104 may interface, e.g., communicate, with device 108, and interface 120b is also up. Identification logic 124 is suitable for identifying remote device 112 as being within a propagation network associated with device 104 and expected to be CDP-enabled, and as not having CDP turned on. In one embodiment, when a subnet mask is /30, identification logic 124 may also be arranged to identify the address, e.g., an Internet protocol (IP) addresses, for remote device 112. It should be appreciated that an IP address for remote device 112 may be within a range of IP addresses associated with, or otherwise expected to be associated with, network 100.

Figure 2:
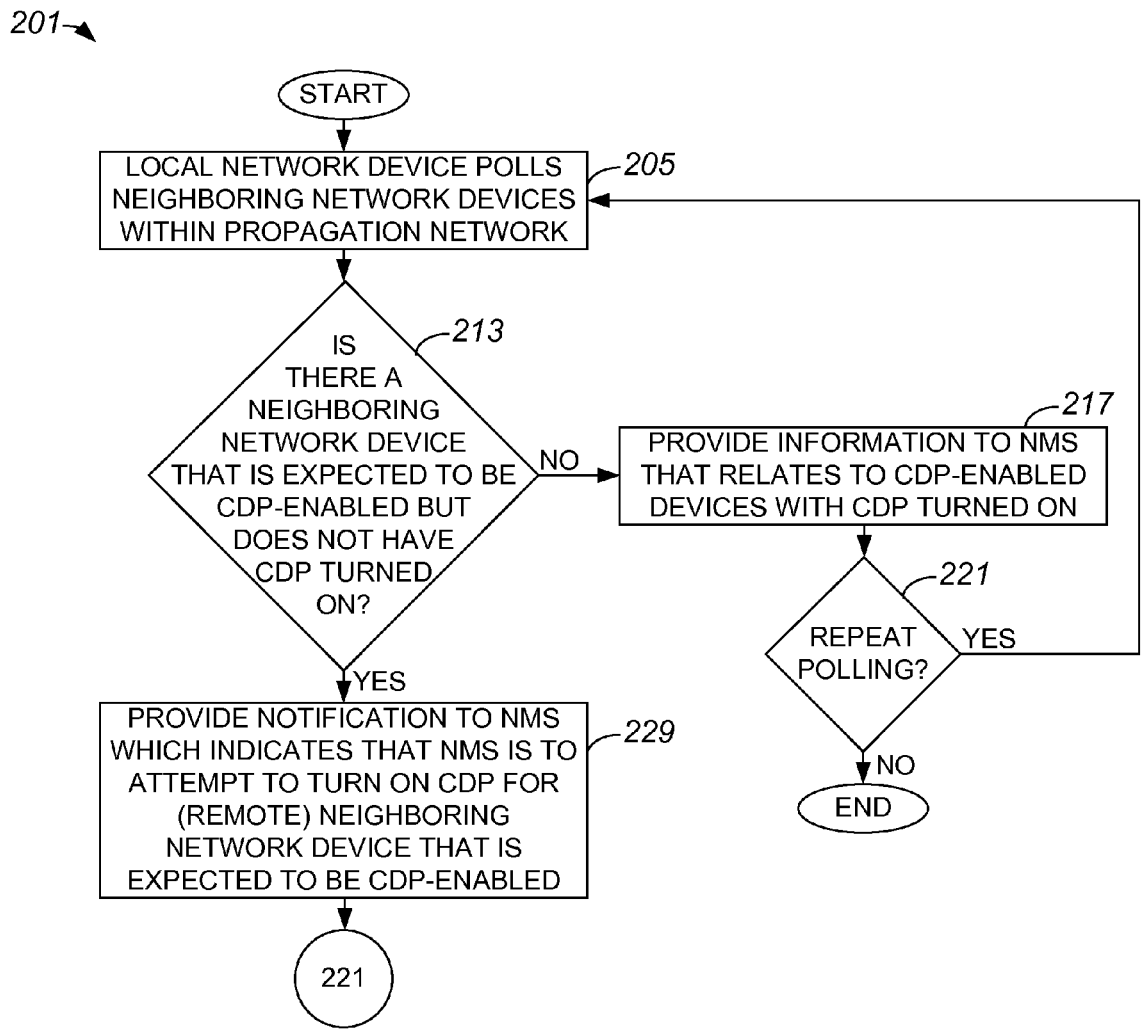
FIG. 2 is a process flow diagram which illustrates one general method of discovering devices in a network in accordance with an embodiment.

With reference to FIG. 2, a method of discovering devices in a network will be described in accordance with an embodiment. A method 201 of discovering devices in a network begins at step 205 in which a local network device polls neighboring network devices within a propagation network. The propagation network includes network devices which are connected substantially directly to LANs. The polling is generally performed to gather information associated with the neighboring network devices, and is substantially propagated to the boundaries of the propagation network. Polling neighboring network devices may include sending requests to, or otherwise soliciting announcements from, the neighboring network devices, as will be appreciated by those skilled in the art. In one embodiment, where an interface is a point-to-point interface with a /30 subnet mask for an IP address, the local network device has have a particular address, e.g., an IP address, that may be substantially deduced.

After the local network device polls neighboring network devices within the propagation network, a determination is made in step 213 as to whether there is at least one neighboring network device that is expected by the local network device to be CDP-enabled but does not have CDP turned on. Such a determination will be discussed in more detail with respect to FIG. 3. If the determination is that there is not at least one neighboring network device that is expected by the local network device to be CDP-enabled but does not have CDP turned on, the indication is that CDP is turned on for all network devices which were polled. It should be appreciated that the indication may be substantially inherent, and may not actually be provided to the local network device. As such, process flow moves from step 213 to step 217 in which the local network device provides information to the NMS that relates to the CDP-enabled devices with CDP turned on. That is, the NMS is provided with information that may allow the NMS to update information relating to network topology.

After information is provided to the NMS, a determination is made in step 221 as to whether the polling of neighboring network devices within the propagation network is to be repeated. It should be appreciated that while polling of neighboring network devices may occur after information is provided to the NMS, there is no dependency In one embodiment, polling may be repeated periodically, as for example at predetermined time intervals. Hence, a determination of whether to repeat polling may depend upon, but is not limited to depending up, whether a predetermined time period has elapsed. In one embodiment, in lieu of repeating polling, once CDP is enabled on a neighboring device, the neighboring device may then poll its neighbors.

If it is determined in step 221 that polling is to be repeated, the process flow returns to step 205 in which the local network device polls neighboring network devices within the propagation network. Alternatively, if it is determined that polling is not to be repeated, then the method of discovering devices in a network is completed.

Returning to step 213, if it is determined that there is at least one neighboring device that is generally expected to be CDP-enabled but does not have CDP turned on, then the local network device provides a notification to the NMS in step 229 which indicates that the NMS is to attempt to turn on CDP for the neighboring network device that is expected by the local network device to be CDP-enabled but does not have CDP turned on. After the notification is provided to the NMS, process flow moves to step 221 in which it is determined whether the polling is to be repeated.

Figure 3:
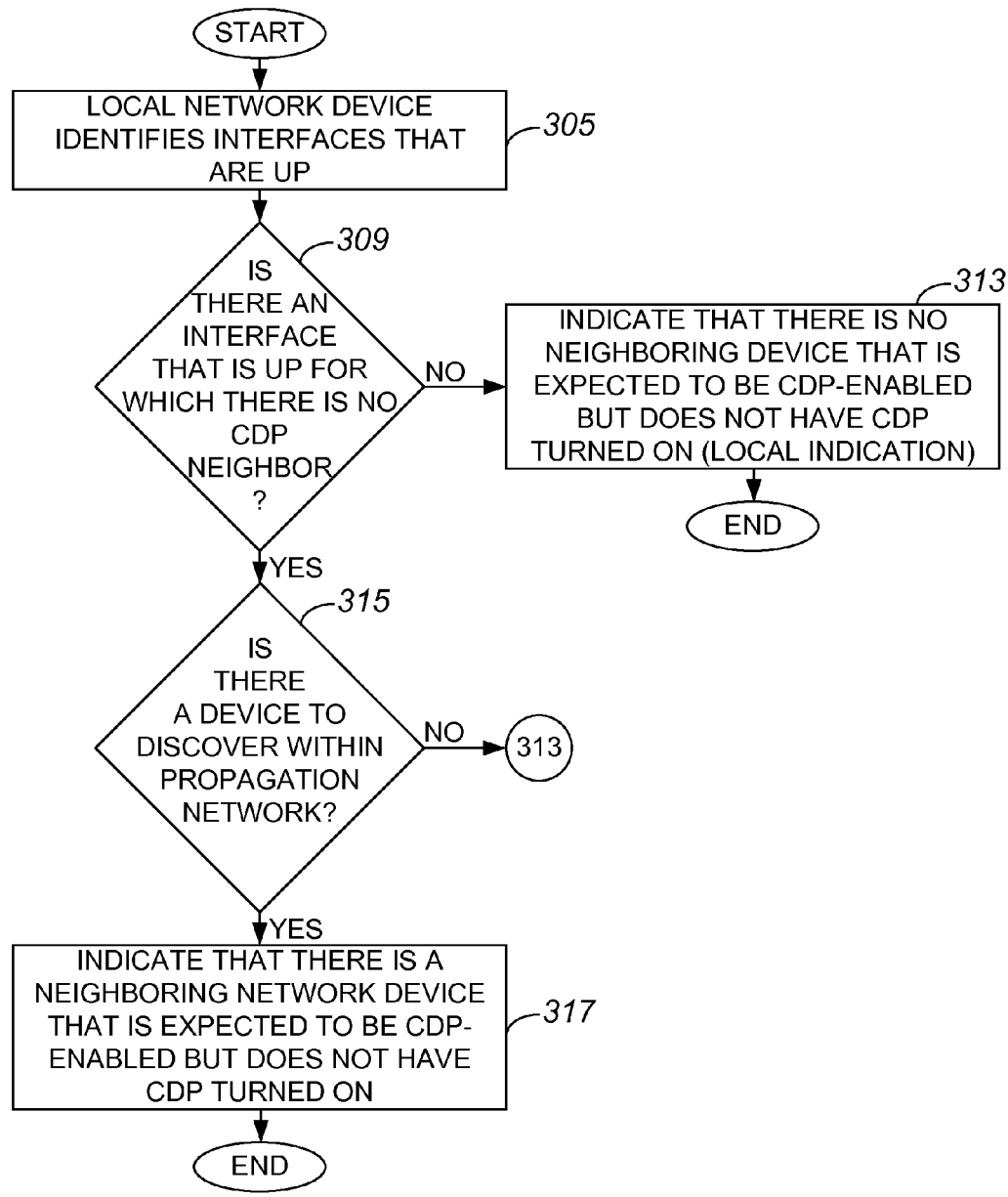
FIG. 3 is a process flow diagram which illustrates one method of determining whether there is a network device within a propagation network that is expected to be CDP-enabled but does not have CDP turned on, e.g., step 213 of FIG. 2, in accordance with an embodiment.

FIG. 3 is a process flow diagram which illustrates one method of determining whether there is a network device within a propagation network that is expected to be CDP-enabled but does not have CDP turned on, e.g., step 213 of FIG. 2, in accordance with an embodiment. A process 213 of determining whether there is a neighboring device that does not have CDP turned on begins at step 305 in which a local network identifies interfaces on the network device that are up. Once interfaces that are up are identified, then it is determined in step 309 whether there is an interface that is up, e.g., active or connected, for which there appears to be no CDP neighbor, e.g., where there may be a CDP-enabled device for which CDP is not on. When an interface is up, but there does not appear to be a neighbor with CDP turned on, then implication may be that there is a neighbor that is CDP-enabled but does not have CDP turned on. In one embodiment, the determination may include ascertaining whether there is an interface that is up or otherwise active, and appears to be substantially connected to a device that does not have CDP turned on.

If it is determined in step 309 that there is no interface that is up for which there does not appear to be a CDP neighbor, an indication is made in step 313 that there is effectively no neighboring device that is expected to be CDP-enabled but does not have CDP turned on. After the indication is made, the process of determining whether there is a neighboring device that does not have CDP turned on is completed.

Alternatively, if it is determined in step 309 that there is an interface that is up for which there appears to be no CDP neighbor, a determination is made in step 315 as to whether there is a device to discover within the propagation network. If it is determined that there is no device to discover within the propagation network, process flow proceeds to step 313 in which a local indication is made that there is effectively no neighboring device that is expected to be CDP-enabled but does not have CDP turned on. If, however, it is determined that there is a device to discover within the propagation network, then an indication is made in step 317 that there is a neighboring network device, e.g., a device that is a neighbor to the local network device within the propagation network, that is expected to be CDP-enabled, but does not have CDP turned on. In one embodiment, if the local network device determines that there is an interface that is up, but no apparent CDP neighbor, the local network device may send an SNMP notification to the NMS in which it is effectively expressed that CDP or, more generally, LLDP, should be turned on for that neighbor. The process of determining whether there is a neighboring device that does not have CDP turned on is completed after the indication is made in step 317.

Figure 4:
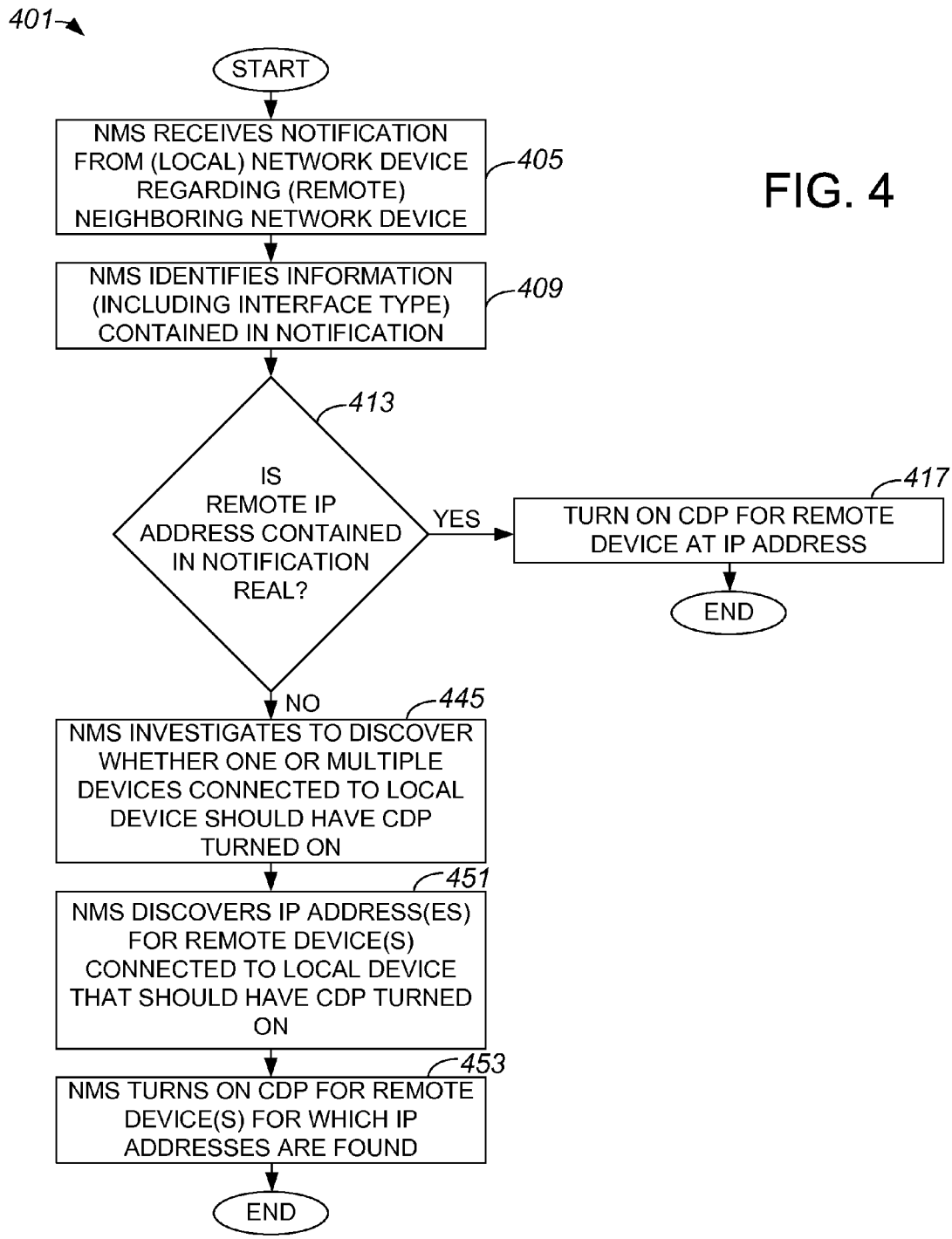
FIG. 4 is a process flow diagram which illustrates a method of processing a notification which indicates that an NMS is to attempt to turn on CDP for a remote network device that is expected to be CDP-enabled in accordance with an embodiment.

A local network device typically alerts an NMS or a network management application when the local network device has essentially identified a neighboring network device that is expected to be CDP-enabled but does not have CDP turned on. Upon being alerted or otherwise notified, the NMS may effectively process the information provided with the alert or notification. During processing, the NMS may identify whether the neighboring network device identified in the alert or notification is either CDP-enabled and not turned on, or if the neighboring network device is not CDP-enabled. FIG. 4 is a process flow diagram which illustrates a method of processing a notification which indicates that an NMS is to attempt to turn on CDP for a remote network device that is expected to be CDP-enabled in accordance with an embodiment. A method 401 of processing a notification begins at step 405 in which an NMS receives a notification from a local network device regarding a remote neighboring network device. It should be appreciated that while an NMS is described, a network management application or substantially any application with network management capabilities may instead receive notification regarding a remote neighboring network device.

Once the NMS receives or otherwise obtains a notification regarding a remote neighboring network device, the NMS identifies information contained in the notification in step 409. The information contained in the notification includes, but is not limited to including, an interface type and an indication of an address, e.g., an IP address, for the remote neighboring network device. As will be appreciated by those skilled in the art, a seed router may pool appropriate address resolution protocol (ARP) tables to discover the IP address if the remote neighboring device before the IP address is provided to the NMS. In one embodiment, the interface type may be a point-to-point interface type or a point-to-multipoint device, e.g., a multi-point device. When an interface is a point-to-point interface, a local network device is aware of whether there is a remote, CDP-capable neighboring device. When an interface is a multipoint interface, a local network device generally is unable to determine how many CDP-capable devices are available on the network.

A determination is made in step 413 as to whether a remote IP address contained interface type included in the notification is a real IP address. The remote IP address may be, for example, associated with a point-to-point link with a /30 subnet.

If it is determined in step 413 that the remote IP address contained in the notification is a real IP address, then in step 417, CDP is turned on for the remote neighboring device. The NMS may cause CDP to be turned on for the remote neighboring device using any suitable method. After CDP is turned on for the remote neighboring device, the method of processing a notification is completed.

Alternatively, if it is determined in step 413 that the remote IP address contained in the notification is not real, the indication, in one embodiment, is that the remote IP address is unknown, e.g., 0.0.0.0. When the remote IP address is unknown, the implication may be, for example, that there is a point-to-point interface type with no /30 subnet or that there is a point-to-multipoint interface type.

If the remote IP address contained in the notification is determined not to be real in step 413, then process flow moves to step 445 in which the NMS investigates to discover whether one or multiple devices that are effectively connected to the local device should have CDP turned on. Any suitable method may be used to discover whether one or multiple devices should have CDP turned on. In step 451, the NMS discovers an IP address for a remote device, or IP addresses for remote devices, that are substantially connected to the local device that should have CDP turned on. After the NMS discovers one or more IP addresses, the NMS turns on CDP in step 453 for the one for the one or more remote devices that correspond to the one or more IP addresses. Once the one or more remote devices are turned on, the
the method of processing a notification is completed.

Figure 5:
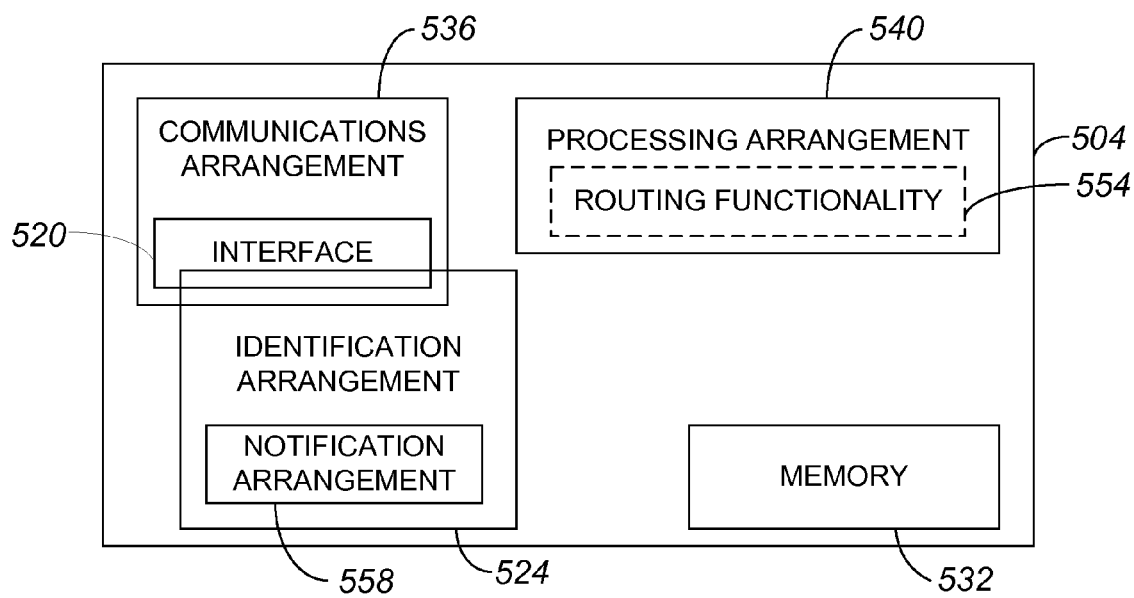
FIG. 5 is a diagrammatic representation of a CDP-enabled device in accordance with an embodiment.

As mentioned above, a CDP-enabled device that is a local network device is generally configured to notify an NMS or network management application that there may be a remote neighboring device that is CDP-enabled but does not have CDP turned on. With reference to FIG. 5, one CDP-enabled device that is a local network device will be described in accordance with an embodiment. A CDP-enabled device 504, which may be a router, includes a processing arrangement 540 that is arranged to perform functions associated with CDP-enabled device 504. By way of example, if device 504 is a router, processing arrangement 540 may include routing functionality 554 that is configured to allow device 504 to receive and to route signals. In general, processing arrangement 540 may include at least one microprocessor.

Device 504 also includes a communications arrangement 536 that is arranged to cooperate with processing arrangement 540 to allow device 504 to receive communications from, and provide communications to, other devices and/or a NMS in the same network as device 504. Communications arrangement 536 generally includes at least one interface 520 that is configured to allow device 504 to communicate with, as for example to exchange information with, devices which are within the same network as device 504. If interface 520 is up, the indication is that device 504 is effectively connected to another device through interface 520. Alternatively, if device 520 is down, the indication is that device 504 is effectively not connected to any other device through interface 520.

Identification arrangement 524 is configured to allow addresses of devices which are neighbors to device 504 to be identified. For example, identification arrangement 524 may identify an address associated with a neighboring device that is substantially connected to, or otherwise in communication with, device 504 through interface 520. Interface 520 may generally allow device 504 to communicate with other devices or entities on a network.

A notification arrangement 558 may be included in identification arrangement 524. Notification arrangement 558 is generally configured to send or otherwise provide an alert or a notification to an NMS when identification arrangement 524 identifies a neighboring device that is expected to be CDP-enabled but does not have CDP turned on. Notification arrangement 558 may create a notification, as for example an SNMP notification, which includes, but is not limited to including, an address of device 504, information regarding interface 520 such as an interface type, and an address of the neighboring device that is expected to be CDP-enabled but does not have CDP turned on. As previously mentioned, the interface type may be a point-to-point interface type or a point-to-multipoint interface type. A point-to-point interface type may have a /30 subnet, or may be substantially without a /30 subnet. In one embodiment, the address of the neighboring device may be an IP address.

A memory 532 allows information obtained by device 504 to be stored. Memory 532 may generally store information which is utilized by identification arrangement 524 including, but not limited to including, a range of addresses associated with a network of which device 504 is a part. Memory 532 may be embodied as a database, random-access memory, read-only memory, and/or any other suitable data structure that is arranged to store data or information.

Although only a few embodiments of the present disclosure have been described, it should be understood that the present disclosure may be embodied in many other specific forms without departing from the spirit or the scope of the present disclosure. By way of example, a local network device has been described as notifying a NMS or similar application when it is determined that a remote neighboring network device does not have CDP turned on, but is expected to have CDP turned on. A local network device may, in some instances, determine whether an address, e.g., an IP address, associated with the remote neighboring network device is within a range of addresses. If the address is within the range of addresses, the local network device may notify the NMS that the remote neighboring network device is expected to have CDP turned on. If, however, the address is not within the range of addresses, the local network device may identify the remote neighboring network device as not belonging to the same network as the local network device. When the local network device identifies the remote neighboring network device as not belonging to the same network as the local network device, the local network device may decide not to send a notification regarding the remote neighboring network device to the NMS.

In one embodiment, a NMS configures a propagation network in a selected device, e.g., router, within an overall network. Such a propagation network may be arranged to contain a network and/or subnet of one or more networks to be discovered. The propagation network may be propagated, as for example through a CDP type-length-value (TLV) frame format, to substantially all interfaces to which the network to be discovered belongs.

While notification which indicates that there may be a CDP-enabled device on which CDP is not turned on is described as being sent to an NMS, it should be appreciated that notification which indicates that there may be an LLDP-enabled device on which LLDP is not turned on may also be sent to an NMS or similar device without departing from the spirit or the scope of the present disclosure. For an embodiment in which LLDP-based discovery is supported, notification may be associated with an SNMP notification contained in an LLDP-EXT-MED-MIB.

In general, CDP and LLDP, as well as any other suitable discover mechanism, may run or execute on any suitable network device. Such devices include, but are not limited to including, computers, routers, bridges, access servers, phones, and switches.

Once the disposition of a remote network device which is expected to be CDP-enabled but does not have CDP turned on is determined, an NMS may effectively decide what actions to take, if any, in relation to the remote network device. For instance, if a remote network device is determined not to be CDP-enabled, the NMS may decide how to include that remote network device in its rendering of a network topology.

The embodiments may be implemented as hardware and/or software logic embodied in a tangible medium that, when executed, is operable to perform the various methods and processes described above. That is, the logic may be embodied as physical arrangements or components. For example, an arrangement that effectively deduces whether there is a CDP neighbor may include hardware logic, software logic, or a combination of both hardware and software logic. The tangible medium may be substantially any computer-readable medium that is capable of storing logic which may be executed, e.g., by a computing system, to perform methods and functions associated with the embodiments.

The steps associated with the methods of the embodiments may vary widely. Steps may be added, removed, altered, combined, and reordered without departing from the spirit of the scope of the present disclosure. Therefore, the present examples are to be considered as illustrative and not restrictive, and the disclosure is not to be limited to the details given herein, but may be modified within the scope of the appended claims.

What is claimed is:

1. A method comprising:
identifying whether there is a first device in a network that is expected to be associated with a discovery protocol but does not have the discovery protocol turned on, wherein identifying whether there is the first device in the network that is expected to be associated with the discovery protocol but does not have the discovery protocol turned on includes determining whether an address associated with the first device is within a first range of addresses, the first range of addresses associated with devices expected to have the discovery protocol turned on; and
providing a notification to a management arrangement when the first device is identified, the management arrangement being arranged to manage the network, wherein the notification is arranged to indicate that the first device is expected to be associated with the discovery protocol but does not have the discovery protocol turned on.

2. The method of claim 1 wherein the discovery protocol is a Cisco Discovery Protocol (CDP).

3. The method of claim 2 wherein the management application is a Network Management Server (NMS).

4. The method of claim 2 wherein identifying whether there is a first device in the network includes utilizing a second device in the network to identify whether there is the first device in the network.

5. The method of claim 4 wherein utilizing the second device in the network to identify whether there is a first device in the network includes determining whether there is a first interface associated with the second device that is active and is arranged to be in communication with the first device.

6. The method of claim 5 wherein the notification includes an indication of the address associated with the first device and an indication of an interface type associated with the first interface.

7. The method of claim 6 wherein the interface type is one selected from the group including a point-to-point interface type and a point-to-multipoint interface type.

8. The method of claim 6 wherein the notification is a Simple Network Management Protocol (SNMP) notification.

9. The method of claim 1 wherein the network is a propagation network, the method further including:
defining boundaries associated with the propagation network, wherein identifying whether there is a first device in the network that is expected to be associated with the discovery protocol but does not have the discovery protocol turned on includes discovering the first device within the boundaries associated with the propagation network.

10. The method of claim 1 further including:
discovering new devices in the network, wherein discovering the new devices in the network includes identifying whether there is the first device in the network that is expected to be associated with the discovery protocol but does not have the discovery protocol turned on.

11. Logic encoded in one or more non-transitory computer-readable media for execution and when executed operable to:
identify whether there is a first device in a network that is expected to be associated with a discovery protocol but does not have the discovery protocol turned on, wherein the logic operable to identify whether there is a first device in a network that is expected to be associated with a discovery protocol but does not have the discovery protocol turned on is further operable to determine whether an address associated with the first device is within a first range of addresses, the first range of addresses associated with devices expected to have the discovery protocol turned on; and
provide a notification to a management arrangement when the first device is identified, the management arrangement being arranged to manage the network, wherein the notification is arranged to indicate that the first device is expected to be associated with the discovery protocol but does not have the discovery protocol turned on.

12. The logic of claim 11 wherein the discovery protocol is one selected from the group including a Cisco Discovery Protocol (CDP) and a Link Layer Discovery Protocol (LLDP).

13. The logic of claim 12 wherein the management application is a Network Management Server (NMS).

14. The logic of claim 12 wherein the logic operable to identify whether there is a first device in the network is further operable to utilize a second device in the network to identify whether there is the first device in the network.

15. The logic of claim 14 wherein the logic operable to identify whether there is a first device in the network using the second device in the network is further operable to determine whether there is a first interface associated with the second device that is active and is arranged to be in communication with the first device.

16. The logic of claim 15 wherein the notification includes an indication of the address associated with the first device and an indication of an interface type associated with the first interface.

17. The logic of claim 16 wherein the interface type is one selected from the group including a point-to-point interface type and a point-to-multipoint interface type.

18. The logic of claim 16 wherein the notification is a Simple Network Management Protocol (SNMP) notification.

19. The logic of claim 10 wherein the network is a propagation network, the logic further being operable to:
define boundaries associated with the propagation network, wherein the logic operable to identify whether there is a first device in the network that is expected to be associated with the discovery protocol but does not have the discovery protocol turned on is further operable to discover the first device within the boundaries associated with the propagation network.

20. The logic of claim 10 further operable to:
discover new devices in the network, wherein the logic operable to discover the new devices in the network includes the logic operable to identify whether there is the first device in the network that is expected to be associated with the discovery protocol but does not have the discovery protocol turned on.

21. An apparatus comprising:
means for identifying whether there is a first device in a network that is expected to be associated with a discovery protocol but does not have the discovery protocol turned on wherein the means for identifying whether there is the first device in the network that is expected to be associated with the discovery protocol but does not have the discovery protocol turned on include means for determining whether an address associated with the first device is within a first range of addresses, the first range of addresses associated with devices expected to have the discovery protocol turned on; and
means for providing a notification to a management arrangement when the first device is identified, the management arrangement being arranged to manage the network, wherein the notification is arranged to indicate that the first device is expected to be associated with the discovery protocol but does not have the discovery protocol turned on.

* * * * *